Feb. 16, 1960 — W. MANN ET AL — 2,925,152
COMBINATION BRAKE
Filed Jan. 27, 1956 — 3 Sheets-Sheet 2

INVENTORS.
William Mann and
Bernard Maloney
By: Walter F. Schlegel, Jr. Atty.

Witness:
Richard W. Carpenter

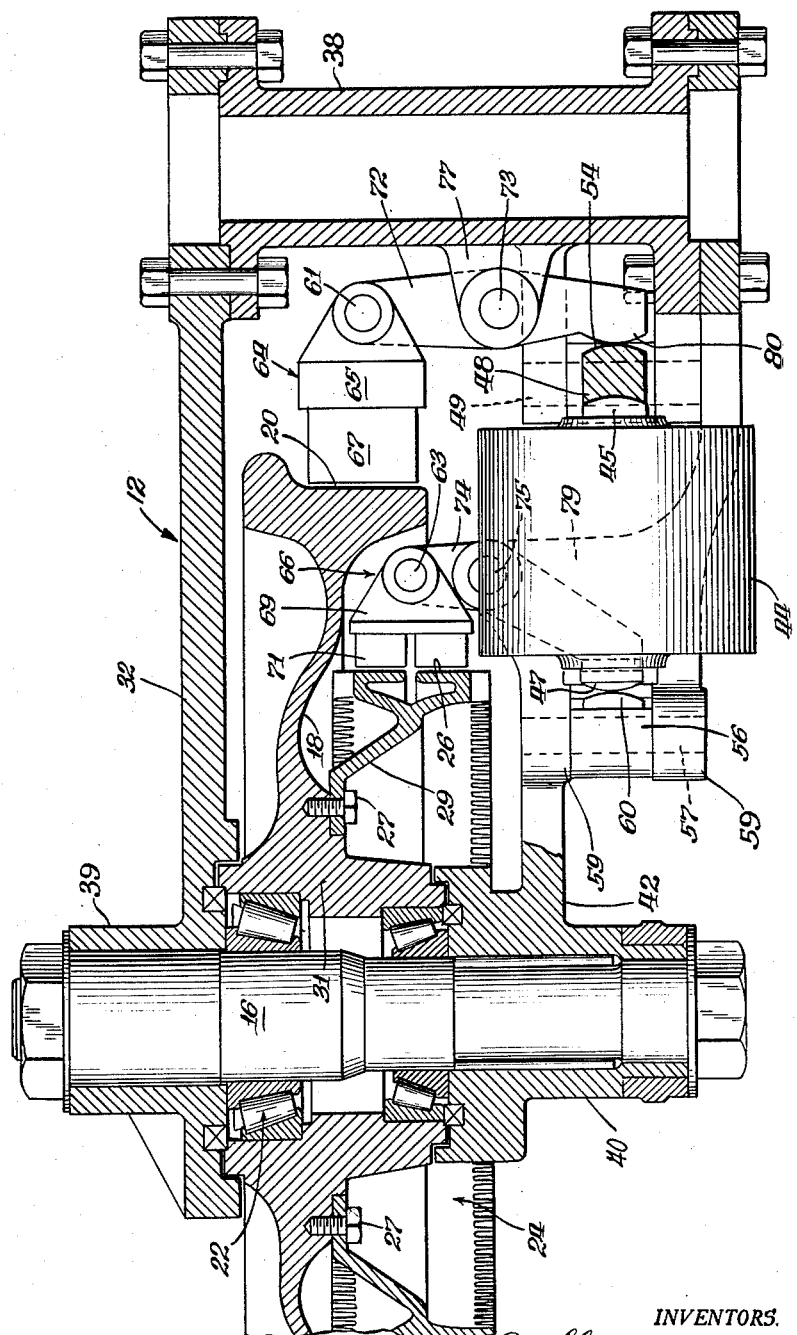

United States Patent Office 2,925,152
Patented Feb. 16, 1960

2,925,152
COMBINATION BRAKE

William Mann and Bernard Maloney, Gary, Ind., assignors to American Steel Foundries, Chicago, Ill., a corporation of New Jersey Application January 27, 1956, Serial No. 561,765

13 Claims. (Cl. 188—58)

This invention relates to brake arrangements, and more particularly to a combination brake arrangement for a modern high speed lightweight railway car.

The invention comprehends an arrangement which includes both a tread, or wheel, brake and a drum, or off-wheel, brake.

It is well known to those familiar with the railway art that both tread brakes (wherein metallic shoes are brought into engagement with the outer peripheral surface of a wheel), and drum brakes (wherein brake shoes generally of non-metallic composition are brought into engagement with a peripheral surface of a drum or disk) have desirable characteristics when employed in connection with railway cars. It is apparent, therefore, that a brake arrangement successfully incorporating the desired features of both types of brakes would be highly advantageous.

Although so-called combination brake arrangements heretofore have been employed on railway cars, most of these arrangements have been merely an aggregation of independent brake systems of different types, rather than a true combination brake arrangement involving cooperation between the brakes.

With the advent of modern high speed railway trains, the design of brake equipment has taken on added significance because the problems created by reduced spaces and clearances cannot be solved by the use of conventional brake equipment. Additionally, the excessive speeds in the modern trains require highly efficient brake equipment with increased braking power.

It is therefore a primary object of this invention to provide a powerful but compact brake arrangement especially adapted for a lightweight high speed railway car.

Another object of the invention is to provide a combination brake arrangement that includes both tread and drum brakes, with common linkage and common power means, which cooperate to produce a unified braking action.

A further object of the invention is the provision of a lightweight compact frame for supporting a brake mechanism directly from a wheel and axle assembly.

A more specific object of the invention is the provision of a combination brake arrangement having a duplex power cylinder mounted on an axle supported frame and directly connected by dual power and brake levers to friction means engageable with a wheel and a drum, respectively.

Figure 1:
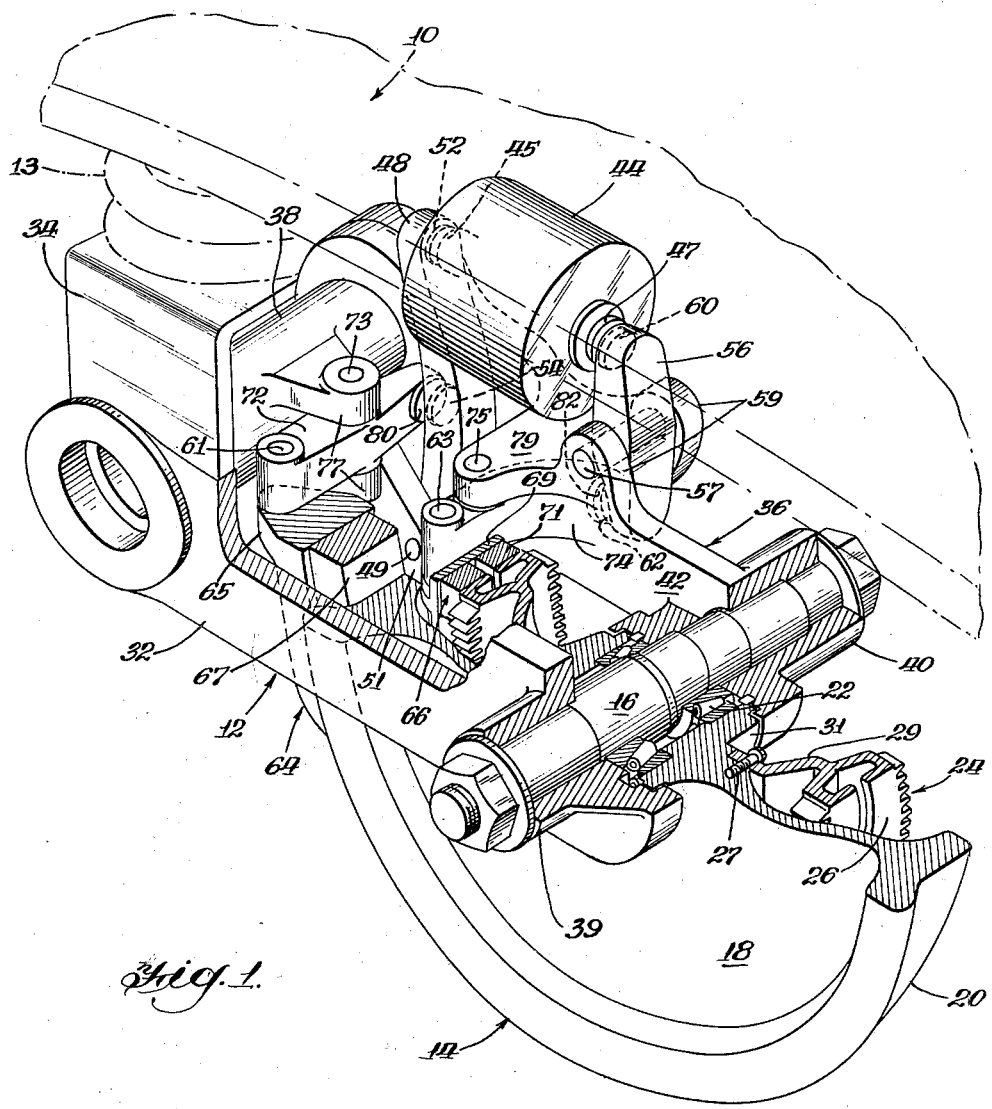
Figure 2:
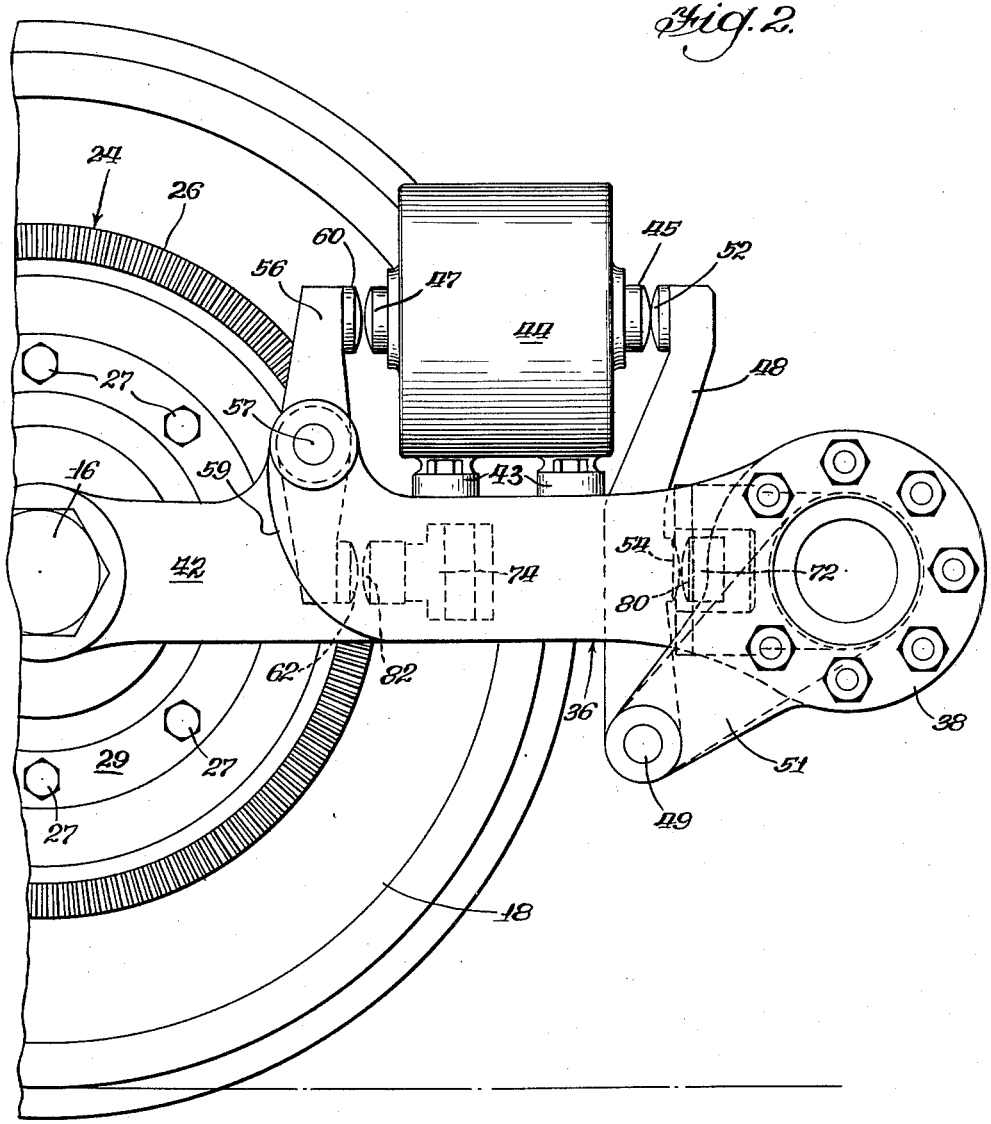

These and other objects of the invention will be apparent from an examination of the following description and drawings, wherein:

Figure 1 is a perspective view, partly in section, of a portion of a railway car embodying our invention, Figure 2 is a fragmentary side elevational view of the structure shown in Figure 1, as viewed from the outboard side of the wheel and axle assembly, and Figure 3 is a fragmentary top plan view, partly in horizontal section, of the structure illustrated in Figure 1.

It will be understood that certain elements have been intentionally omitted from certain views where they are better illustrated in other views.

To describe our invention in detail, referring first to Figure 1, it will be seen that a railway car body, indicated generally at 10, of the lightweight type, is supported at its four corners by separate frames 12 which are mounted on wheel and axle assemblies 14. Resilient support for the body may be afforded by springs 13 interposed between the frames 12 and the underside of the car body (only one such frame and assembly are illustrated as similar arrangements are employed on the other corners of the car).

Each wheel and axle assembly, as illustrated in the drawings, comprises a non-rotating stub axle 16 and a rotating wheel 18 with an anti-friction bearing 22 interposed therebetween. The wheel 18 presents an outer peripheral surface or tread 20. A drum or rotor 24 presenting an outer peripheral surface 26 is rigidly secured to the wheel 18 for rotation therewith by means of stud bolts 27 which interconnect a web 29 of the drum to a hub portion of the wheel.

Referring now to Figure 3 of the drawings, it will be seen that the frame 12 is substantially C-shaped, as seen in plan or horizontal section, and comprises inboard and outboard longitudinally extending side members or arms 32 and 42, respectively, which are interconnected at their outer ends by a transverse member or beam 38. The open or free ends of the arms 32 and 42 are provided with bearing portions 39 and 40, respectively, which house or journally receive the inboard and outboard ends of the axle 16 and are directly supported thereby. The frame also includes a shelf section 34 (illustrated diagrammatically in Figure 1) upon which the springs 13 are seated.

It will be understood that the frame 12 may be provided with another pair of arms 32 and 42 (not shown) having bearing members 39 and 40 and extending in an opposite direction from the arms illustrated in the drawings. The other pair of arms 32 and 42 may also be connected by a beam 38 and may be provided with a shelf section 34 for use with other car body supporting springs 13.

Referring now to Figure 2, it will be seen that the power means preferably comprises a duplex power cylinder 44 having opposed pistons 45 and 47. The cylinder is mounted on the outboard side member 42 by means of mounting brackets 43, with the operating axis of the cylinder extending longitudinally of the frame.

A generally vertical dead cylinder or power lever 48, fulcrumed at its lower extremity by pin 49 to beam lugs 51, is provided at its upper extremity with a boss 52 engageable with power cylinder piston 45 and is provided intermediate its ends with a boss 54, the purpose of which is hereinafter described. Another generally vertical dead cylinder or power lever 56, fulcrumed intermediate its ends by pin 57 to outboard side member lugs 59, is provided at its upper extremity with a boss 60 engageable with power cylinder piston 47 and is provided at its lower extremity with a boss 62, the purpose of which is hereinafter described.

A pair of brake shoe assemblies 64 and 66 are disposed outboardly adjacent the wheel and axle assembly. Brake shoe assembly 64 comprises a brake head 65 and a preferably metallic brake shoe 67 engageable with wheel surface 20, while brake shoe 66 comprises a brake head 69 and a preferably non-metallic brake shoe 71 engageable with drum surface 26.

Brake shoe assemblies 64 and 66 are pivoted by pins 61 and 63, respectively, to the inboard ends of a pair of generally horizontal dead brake levers 72 and 74, respectively, which in turn are fulcrumed intermediate their ends by pins 73 and 75 to brake beam and outboard side member lugs 77 and 79, respectively. The outboard ends of brake levers 72 and 74 are provided with bosses 80 and 82 which are engageable with bosses 54 and 62, respectively, of cylinder levers 48 and 56.

To describe the operation of the invention, it will be seen that as left and right power cylinder pistons 45 and 47, respectively, as seen in Figure 1, are energized, they engage the upper extremities of cylinder levers 48 and 56 causing the cylinder levers to rotate clockwise and counterclockwise (as seen in Figure 2) about pins 49 and 57, respectively. As the cylinder levers 48 and 56 rotate, they engage the outboard extremities of wheel and drum brake levers 72 and 74 causing the brake levers to rotate counterclockwise and clockwise, as seen from above, about pins 73 and 75 thereby carrying brake shoe assemblies 64 and 66 into engagement with wheel and drum surfaces 20 and 26, respectively.

Thus it is apparent that we have provided a combination brake arrangement that, by virtue of its simplicity and compactness, is particularly suitable for use in lightweight railway cars.

We claim:

1. A combination brake arrangement for a lightweight railway car having a frame and a supporting wheel and axle assembly comprising, in combination: a drum rigidly secured to a wheel of said assembly for rotation therewith and presenting an external peripheral surface, an external peripheral friction surface on the wheel, brake shoe assemblies engageable with respective surfaces, a duplex power cylinder mounted on the frame outboardly of the wheel and having its operating axis extending longitudinally of the frame, a pair of substantially vertical extending dead cylinder levers having their upper extremities operatively connected to the power cylinder, one of said cylinder levers having its lower end fulcrumed to the frame, and the other of said levers being fulcrumed intermediate its ends to the frame, and a pair of substantially horizontal dead brake levers fulcrumed intermediate their ends to the frame and having their inboard ends pivoted to the wheel and drum brake shoe assemblies, respectively, one of said brake levers having its outboard end operatively connected to said one cylinder lever intermediate the ends of said one cylinder lever, and the other of said brake levers having its outboard end operatively connected to the lower end of said other cylinder lever.

2. A combination brake arrangement for a lightweight railway car having a frame and a supporting wheel and axle assembly comprising, in combination: a peripheral friction surface on the wheel of said assembly, a drum secured to the wheel and presenting another peripheral surface, brake shoe assemblies engageable with the respective friction surfaces, a duplex power cylinder supported by the frame outboardly thereof with its operating axis extending longitudinally thereof, a pair of dead cylinder levers fulcrumed to the frame and operatively connected to the power cylinder, said cylinder levers being disposed in generally parallel relationship to each other and in a common plane, and a pair of dead brake levers fulcrumed to the frame and operatively interconnecting the respective cylinder levers and the respective brake shoe assemblies, said brake levers being disposed in generally paralllel relationship to each other and in a common plane normal to the plane of said cylinder levers.

3. A combination brake arrangement for a lightweight railway car having a frame and a supporting wheel and axle assembly comprising, in combination: a peripheral friction surface on a wheel of said assembly, a drum rotatable with said assembly and presenting a peripheral surface thereon, a pair of brake shoe assemblies disposed adjacent each other on the same side of said wheel and axle assemblies engageable with respective surfaces, power means on the frame, a pair of dead power levers fulcrumed to the frame for rotation about parallel axes and operatively connected to the power means, and a pair of dead brake levers fulcrumed to the frame for rotation about parallel axes and operatively connecting the respective power levers to the respective brake shoe assemblies.

4. A combination brake arrangement for a vehicle having a frame and a supporting wheel and axle assembly comprising, in combination: a friction surface on the wheel, a friction member rotatable with the assembly and presenting another friction surface, a power cylinder mounted on the frame outboardly of the wheel with its operating axis extending longitudinally of the frame, a pair of brake shoe assemblies engageable with respective friction surfaces, a pair of dead cylinder levers fulcrumed to the frame for rotation about parallel axes and operatively connected to the power cylinder, a pair of dead brake levers fulcrumed to the frame for rotation about parallel axes which are normal to said first mentioned axes and interconnecting the respective cylinder levers and the respective brake shoe assemblies.

5. A combination brake arrangement for a vehicle having a frame and a supporting wheel and axle assembly, comprising, in combination: a plurality of rotatable peripheral friction surfaces spaced axially of the assembly from each other, a pair of axially spaced friction means disposed on the same side of the assembly and engageable with the respective surfaces, a power cylinder mounted on the frame outboardly of the wheel with its operating axis extending longitudinally of the frame, a dead vertical cylinder lever fulcrumed at its lower end to the frame and operatively connected at its upper end to the power cylinder, another dead vertical cylinder lever fulcrumed intermediate its ends to the frame and operatively connected at its upper end to the power cylinder, and a pair of dead horizontal brake levers fulcrumed intermediate their ends to the frame with their inboard ends pivoted to the respective friction means and their outboard ends operatively connected to the respective cylinder levers.

6. A combination brake arrangement for a vehicle having a frame and a supporting wheel and axle assembly comprising, in combination: a plurality of rotatable peripheral friction surfaces on the assembly spaced axially from each other, a plurality of friction means spaced axially from each other and disposed on the same side of the wheel and axle assembly, said friction means being engageable with the respective surfaces, a duplex power cylinder mounted on the frame outboardly of the surfaces with its operating axis extending longitudinally of the frame, a pair of dead cylinder levers fulcrumed to the frame for rotative movement in the same direction and operatively connected to the power cylinder, and a pair of dead brake levers fulcrumed to the frame for rotative movement in the same direction and operatively connected to the respective cylinder levers and the respective friction means.

7. In a combination brake arrangement for a vehicle having a frame and a supporting wheel and axle assembly comprising, in combination: axially spaced rotatable peripheral friction surfaces on said assembly, friction means disposed on the same side of the wheel and axle assembly and engageable with the respective surfaces, a pair of dead horizontal brake levers fulcrumed intermediate their ends pivoted to the frame and having their inboard ends pivoted to the respective friction means, a duplex power cylinder mounted on the frame outboardly of the surfaces with its operating axis extending longitudinally of the frame and having a pair of opposed pistons, and a pair of dead vertical cylinder levers fulcrumed to the frame and having their opposite ends abuttably engageable with the power cylinder pistons and the outboard ends of the brake levers, respectively, said brake levers being maintained in generally parallel relationship to each other at all times.

8. In a brake arrangement for a lightweight railway car having an axle with a wheel and drum secured thereto for rotation therewith, the combination of: friction surfaces on the wheel and drum, respectively, brake shoe assemblies engageable with the respective surfaces, a frame comprising inboard and outboard arms extending longitudinally of the car, a transverse beam interconnecting said arms at corresponding ends of said arms, resilient means interposed between said beam and said car, said arms having at their opposite ends bearing portions journalling said axle and supported thereby, a power cylinder mounted on the outboard arm, a pair of substantially horizontal dead brake levers pivotally connected at their inboard ends to the respective brake shoe assemblies and fulcrumed intermediate their ends to the frame, and a pair of substantially vertical dead levers fulcrumed to the frame and connecting the power cylinder to respective brake levers.

9. In a combination brake arrangement for a lightweight railway car having an axle with a rotatable wheel and a rotatable drum secured thereto, the combination of: friction surfaces on the wheel and drum, respectively, friction means engageable with respective surfaces, a frame comprising side elements extending longitudinally of the car and spaced transversely from each other adjacent opposite sides of the wheel and on the same side of the longitudinal vertical center plane of the car, a transverse member interconnecting certain corresponding ends of the elements, resilient means interposed between said transverse member and the car, said elements being provided at their other ends with means to journally receive said axle and be supported thereby, power means mounted on the frame, and lever means fulcrumed to the frame and interconnecting the power means and the respective friction means.

10. In a brake arrangement for a railway vehicle having a body supported adjacent its corners by four independent wheel and axle assemblies each having only a single wheel, the combination of: independent brake means engageable with said assemblies; separate frames supported by respective assemblies supporting said body and related brake means; said frames each comprising a pair of parallel arms extending longitudinally of the vehicle and spaced transversely from each other, and a transversely extending member interconnecting said arms at corresponding ends thereof, the opposite ends thereof having portions journally receiving said assembly for support thereby; and resilient means interposed between the transverse member of each frame and the body to support the latter on the former.

11. A brake arrangement according to claim 10, wherein said brake means comprises a pair of friction means disposed for engagement with a pair of spaced friction surfaces presented by said assembly, a duplex power cylinder mounted on said frame, a pair of dead actuating levers fulcrumed to said frame and connected to the power cylinder, and a pair of dead brake levers fulcrumed to the frame and interconnecting the actuating levers and the respective friction means.

12. A brake arrangement according to claim 10, wherein said brake means comprises a power cylinder rigidly secured to one of the arms of said frame, friction means disposed for engagement with said assembly, dead actuating lever means fulcrumed to the frame and connected to said power cylinder, and dead brake lever means fulcrumed to the frame and interconnecting the actuating lever means and the friction means.

13. A combination brake arrangement for a railway vehicle having a frame and a supporting wheel and axle assembly comprising, in combination: a pair of axially spaced peripheral friction surfaces presented by said assembly; a pair of friction means disposed on the same side of said assembly for engagement with respective surfaces; power means mounted on the frame; a pair of dead power levers fulcrumed to the frame for rotational movement in a common plane and operatively connected to the power means; and a pair of dead brake levers fulcrumed to the frame for rotational movement in a common plane normal to said first mentioned plane and operatively connecting the respective power levers to the respective brake means.

References Cited in the file of this patent

UNITED STATES PATENTS

| | | |
|---|---|---|
| 2,155,222 | Farmer | Apr. 18, 1939 |
| 2,243,459 | Farmer | May 27, 1941 |
| 2,250,725 | Ransom | July 29, 1941 |
| 2,359,806 | Tack | Oct. 10, 1944 |
| 2,386,907 | Pierce | Oct. 16, 1945 |
| 2,581,746 | Baselt | Jan. 8, 1952 |
| 2,685,942 | Bachman | Aug. 10, 1954 |
| 2,695,686 | Bachman et al. | Nov. 30, 1954 |
| 2,809,719 | Polanin | Oct. 15, 1957 |

FOREIGN PATENTS

| | | |
|---|---|---|
| 623,609 | Great Britain | May 19, 1949 |